(12) United States Patent
Hibi et al.

(10) Patent No.: US 8,174,571 B2
(45) Date of Patent: May 8, 2012

(54) APPARATUS FOR PROCESSING IMAGES, APPARATUS FOR PROCESSING REPRODUCED IMAGES, METHOD OF PROCESSING IMAGES, AND METHOD OF PROCESSING REPRODUCED IMAGES

(75) Inventors: Hiroshi Hibi, Tokyo (JP); Masaharu Suzuki, Kanagawa (JP); Satoshi Tabuchi, Kanagawa (JP); Asako Tamura, Kanagawa (JP); Hideo Miyamaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1658 days.

(21) Appl. No.: 11/268,586

(22) Filed: Nov. 8, 2005

(65) Prior Publication Data

US 2006/0119703 A1 Jun. 8, 2006

(30) Foreign Application Priority Data

Nov. 16, 2004 (JP) ................................. 2004-331730

(51) Int. Cl.
*H04N 7/12* (2006.01)
(52) U.S. Cl. ...................................................... 348/143
(58) Field of Classification Search .................. 348/143
See application file for complete search history.

(56) References Cited

U.S. PATENT DOCUMENTS

| 6,583,813 | B1 * | 6/2003 | Enright et al. ................ 348/150 |
| 7,450,735 | B1 * | 11/2008 | Shah et al. .................... 382/103 |

FOREIGN PATENT DOCUMENTS

| JP | 5-39085 | 5/1993 |
| JP | 2000-224542 | 8/2000 |
| JP | 2000-339923 | 12/2000 |
| JP | 2001-333422 | 11/2001 |
| JP | 2002-191044 | 7/2002 |

* cited by examiner

*Primary Examiner* — Jay Au Patel
*Assistant Examiner* — Geepy Pe
(74) *Attorney, Agent, or Firm* — Oblon, Spivak, McClelland, Maier & Neustadt, L.L.P.

(57) ABSTRACT

Thumbnails are used, facilitating any operation on an object that changes from time to time as in a moving picture, thereby to prevent failure in capturing important objects. The present invention provides an apparatus for processing images that includes a moving body detecting unit that detects an object from moving picture information input and checks the object for identity, thereby to determine whether the object is contained in two or more consecutive frames, a thumbnail displaying unit that displays any objects that have appeared within a prescribed period, as thumbnails extracted from a representative frame, on the basis of object information detected by the moving body detecting unit, an operation input unit that receives an operation input made when one of the thumbnails displayed by the thumbnail displaying unit is selected, and a moving picture displaying unit that displays a moving picture that contains the object identified by the selected thumbnail related to the operation input received by the operation input unit.

18 Claims, 4 Drawing Sheets

APPARATUS FOR PROCESSING IMAGES, APPARATUS FOR PROCESSING REPRODUCED IMAGES, METHOD OF PROCESSING IMAGES, AND METHOD OF PROCESSING REPRODUCED IMAGES

CROSS REFERENCE TO RELATED APPLICATIONS

The present invention contains subject matter related to Japanese Patent Application JP 2004-331730 filed in the Japanese Patent Office on Nov. 16, 2004, the entire contents of which being incorporated herein by reference.

BACKGROUND OF THE INVENTION

1. Field of the Invention

The present invention relates to an apparatus for processing images, an apparatus for processing reproduced images, a method of processing images and a method of processing reproduced images, which detect objects from moving picture information. These apparatuses and methods may be applied to, for example, monitoring systems in which two cameras are used, one of which is a sensor camera for scanning a board area, and the other of which is a zooming camera for photographing a target object existing in the broad area.

2. Description of the Related Art

Electronic still cameras have hitherto been used widely. In the electronic still camera, the solid-state imaging element, such as a CCD, receives the light coming from an object photographed and converts the light into an image signal. The image signal can be recorded in a recording medium and can be reproduced from the recording medium. Most electronic still cameras have a monitor that can display photographed still pictures. Thus, any one of the still pictures recorded can be selected and displayed. In the electronic still camera, the image signal supplied to the monitor corresponds to one image of an object photographed.

In recent years, a technique of compressing and synthesizing a plurality of video signals, thereby generating a one-frame video signal, has been proposed (see, for example, Jpn. Pat. Appln. Laid-Open Publication No. 10-108163). A centralized monitoring/recording system has been proposed, too, in which video signals are collected from a plurality of monitoring video cameras and recorded on a recoding medium such as video tape, thus accomplishing monitoring and supervising (see, for example, Jpn. Pat. Appln. Laid-Open Publication No. 2000-243062).

SUMMARY OF THE INVENTION

In a specific business, it is necessary to extract an object of interest from a display screen and perform a sophisticated operation on the object. In such a centralized monitoring/recording system as mentioned above, the entire display screen may be extracted in order to detect an object on the screen. In this case, the frame in which the object is detected can indeed be retrieved, but any specific operation cannot be performed on the object of interest. Further, it cannot be determined whether an object in one frame is identical to an object in another frame. To perform an operation on an object that changes from time to time, the process of reproducing a moving picture must be stopped for some time.

In view of the problems with the related art, it is desirable to facilitate the operation on an object that changes from time to time as in a moving picture, by using thumbnails, thereby to prevent failure in capturing important objects.

Other objects and advantages of the present invention will become clear from the following description of the embodiments, given below.

An apparatus for processing images, according to this invention, includes: a moving body detecting means for detecting an object from moving picture information input and for checking the object for identity, thereby to determine whether the object is contained in two or more consecutive frames; a thumbnail displaying means for displaying any objects that have appeared within a prescribed period, as thumbnails extracted from a representative frame, on the basis of object information detected by the moving body detecting means; an operation input means for receiving an operation input made when one of the thumbnails displayed by the thumbnail displaying means is selected; and a moving picture displaying means for displaying a moving picture that contains the object identified by the selected thumbnail related to the operation input received by the operation input means.

The apparatus for processing images, according to this invention, further includes, for example, a recording means for recording, in a recording medium, the input moving picture information and the object information detected by the moving body detecting means.

The apparatus for processing images, according to the present invention, further includes a broad area photographing means for photographing a broad area and an object tracking and photographing means for tracking an object and providing a magnified image of the object. The moving body detecting means detects the object from the moving picture information obtained by the broad area photographing means and representing an image of the broad area. The moving picture displaying means displays a moving picture obtained by tracking the object detected by the moving body detecting means and magnifying the image of the object by means of the object tracking and photographing means.

An apparatus for processing reproduced images, according to this invention, includes: an information reproducing means for reproducing moving picture information and object information from a recording medium, said object information having been obtained by detecting an object from the moving picture information and checking the object for identity, thereby to determine whether the object is contained in two or more consecutive frames, and representing any objects that have appeared within a prescribed period that are to be displayed as thumbnails extracted from a representative frame; and an information retrieving means for retrieving any object, as a thumbnail, from a list of thumbnails existing in a designated period, on the basis of the object information reproduced from the recording medium.

A method of processing images, according to the present invention, includes the steps of: detecting an object from moving picture information input and checking the object for identity, thereby to determine whether the object is contained in two or more consecutive frames; displaying any objects that have appeared within a prescribed period, as thumbnails extracted from a representative frame, on the basis of object information that has been detected; receiving an operation input made when one of the thumbnail displayed is selected; and displaying a moving picture that contains the object identified by the selected thumbnail related to the operation input that has been received.

In the method of processing images, according to this invention, the moving picture information input and the object information detected are recorded in a recording medium.

A method of processing reproduced images, according to the present invention, includes the steps of: reproducing moving picture information and object information from a recording medium, said object information having been obtained by detecting an object from the moving picture information and checking the object for identity, thereby to determine whether the object is contained in two or more consecutive frames, and representing any objects that have appeared within a prescribed period that are to be displayed as thumbnails extracted from a representative frame; and retrieving any object, as a thumbnail, from a list of thumbnails existing in a designated period, on the basis of the object information reproduced from the recording medium.

In this invention, the object detected in each frame is checked for its identity in order to display a thumbnail of the object, and the thumbnail extracted from a representative frame is utilized. This renders it easy to handle the object that changes from time to time.

In a system wherein any object in each frame of a moving picture can be identified by checking the object for its identity in the process of displaying the thumbnail of the object, each object appearing within a prescribed period is displayed as a thumbnail extracted from a representative frame. Using this thumbnail, the object is designated and an operation is performed on the object. This enhances the maneuverability of the system. For example, the image of a car moving at high speed in the screen may be designated and thereby tracked by a pan/tilt camera. In this case, it is difficult to designate the image of the car by operating the mouse or the like, but it is relatively easy to designate the thumbnail of the car, which is displayed in the thumbnail display region and then to issue a tracking command in a menu.

As indicated above, the objects existing in a recorded moving picture in a period designated are displayed in the form of a list of thumbnails. If the thumbnail of the object of interest is selected from the list and the moving picture is played back, any scene in which the object appears can be easily retrieved. Since any object can be identified, some frames of the moving picture can be skipped to the scene in which the object appears again after having been disappeared.

DETAILED DESCRIPTION OF THE PREFERRED EMBODIMENTS

An embodiment of the present invention will be described in detail, with reference to the accompanying drawings. This invention is not limited to the embodiment described below. Various changes can of course be made, without departing from the scope and spirit of the invention.

Figure 1:
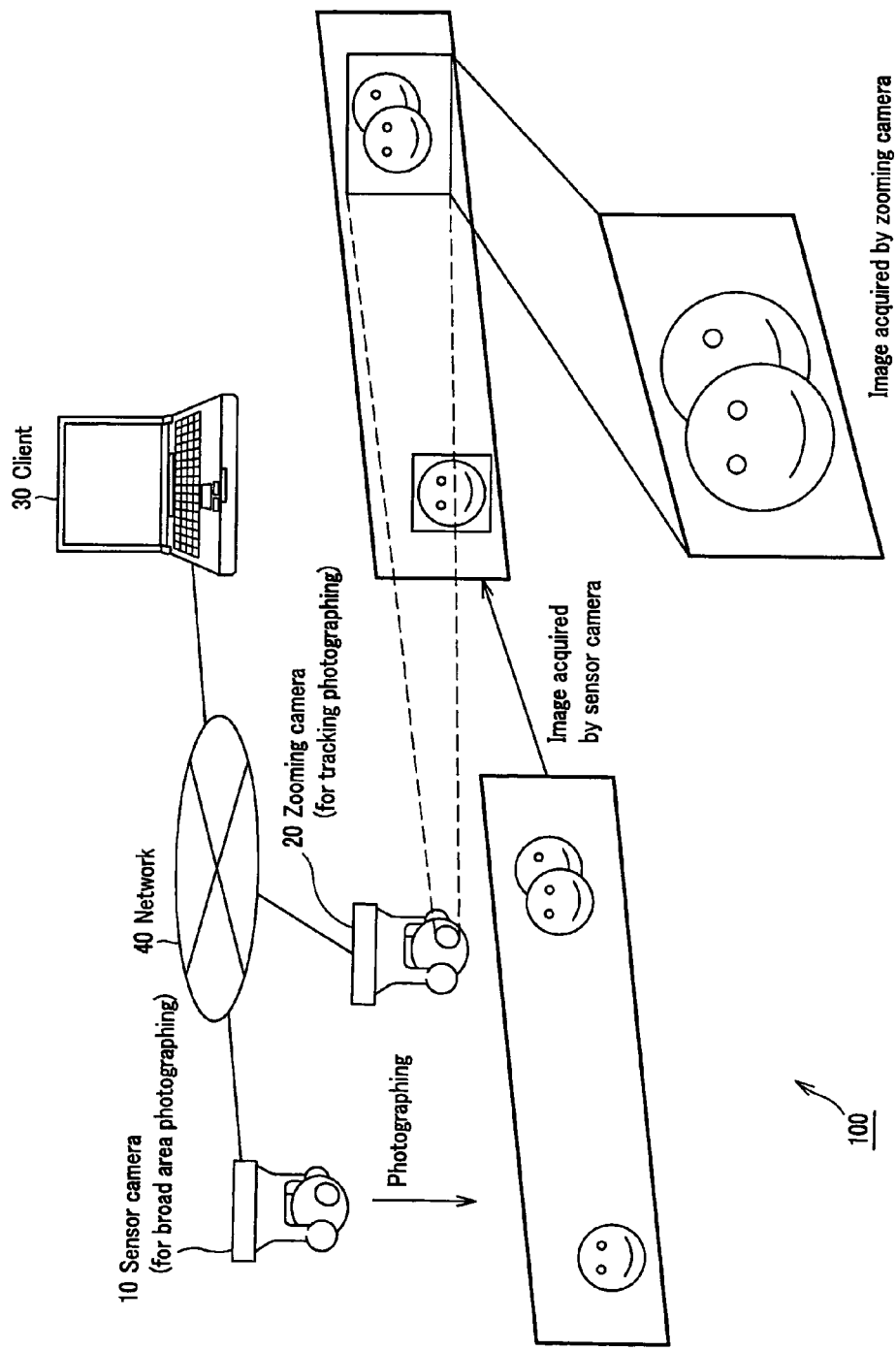
FIG. 1 is a block diagram showing the configuration of a centralized monitoring/recording system according to the present invention.

The present invention is applied to such a centralized monitoring/recording system 100 as is illustrated in FIG. 1.

The centralized monitoring/recording system 100 includes a sensor camera 10, a zooming camera 20, a client 30, and a network 40. The sensor camera 10 can scan a broad area to photograph anything that exists in the monitored area. The zooming camera 20 tracks an object to monitor and photograph the object in the formed of a magnified image. The client 30 remote-controls the cameras 10 and 20. The network 40 connects the cameras 10 and 20 and the client 30. The client 30 has the function of remote-controlling the orientation (pan/tilt) of each camera, the zooming magnification and the photographing.

Figure 2:
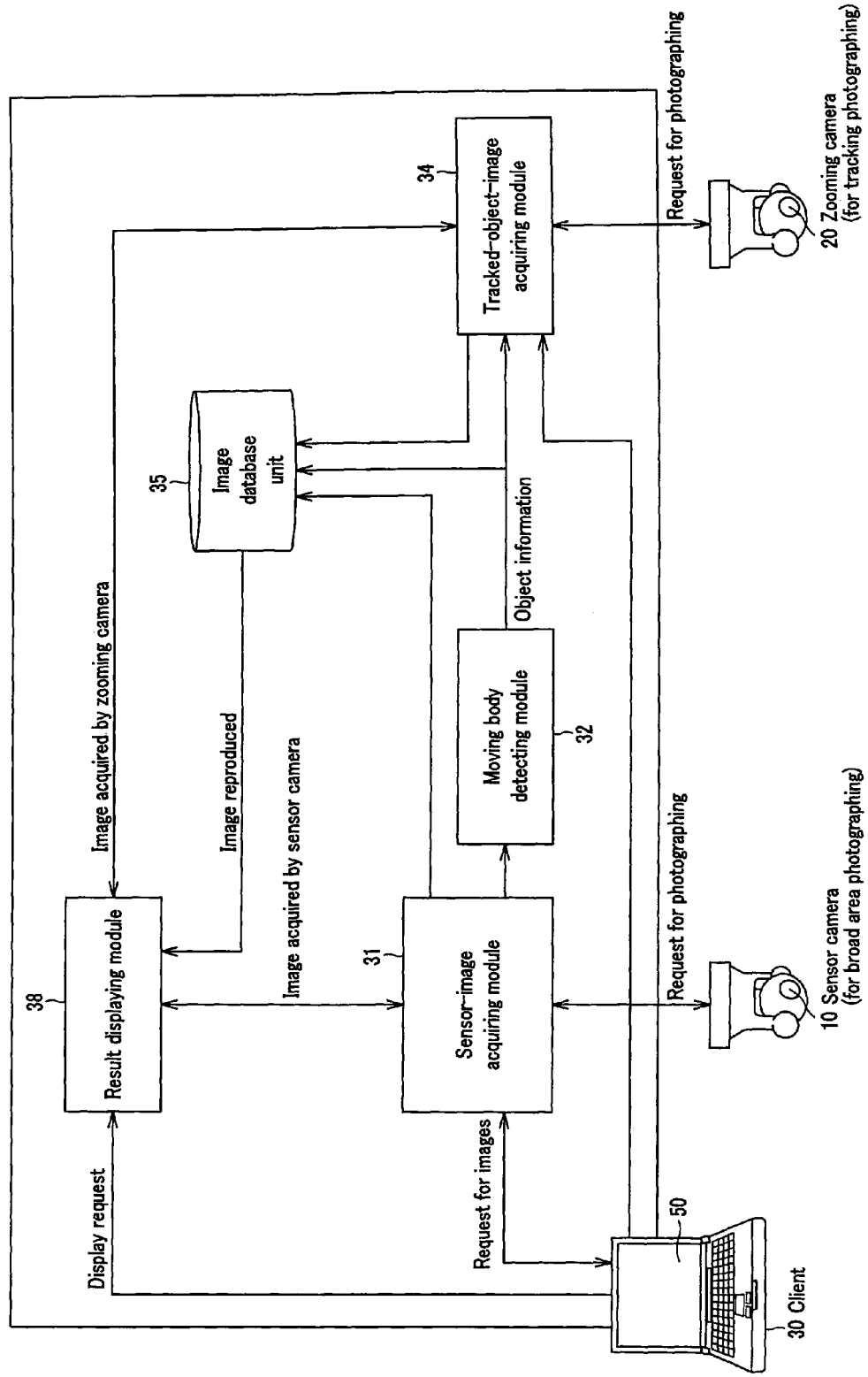
FIG. 2 is a block diagram depicting the function configuration of the client provided in the centralized monitoring/recording system.

As FIG. 2 shows, the client 30 incorporates a sensor-image acquiring module 31, a moving body detecting module 32, a tracked-object-image acquiring module 34, an image database unit 35, a result displaying module 38, and the like. The sensor-image acquiring module 31 uses the sensor camera 10 as sensor for scanning the broad area and detecting any object moving in the monitored area. The moving body detecting module 32 extracts the position and size of the moving object from the image acquired by the sensor-image acquiring module 31. The tracked-object-image acquiring module 34 determines various control parameters, such as pan, tilt and zoom, from the position of view angle, moving speed, size and the like of the object, i.e., the moving object detected by the moving body detecting module 32. The image database unit 35 stores the photographing results data that the sensor camera 10 and zooming camera 20 have obtained. The result displaying module 38 sends the photographing results obtained by the sensor camera 10 and zooming camera 20 and any image data read from the image database unit 35, to the client 30. The client 30 displays the photographing result and the image represented by the image data.

Figure 3:
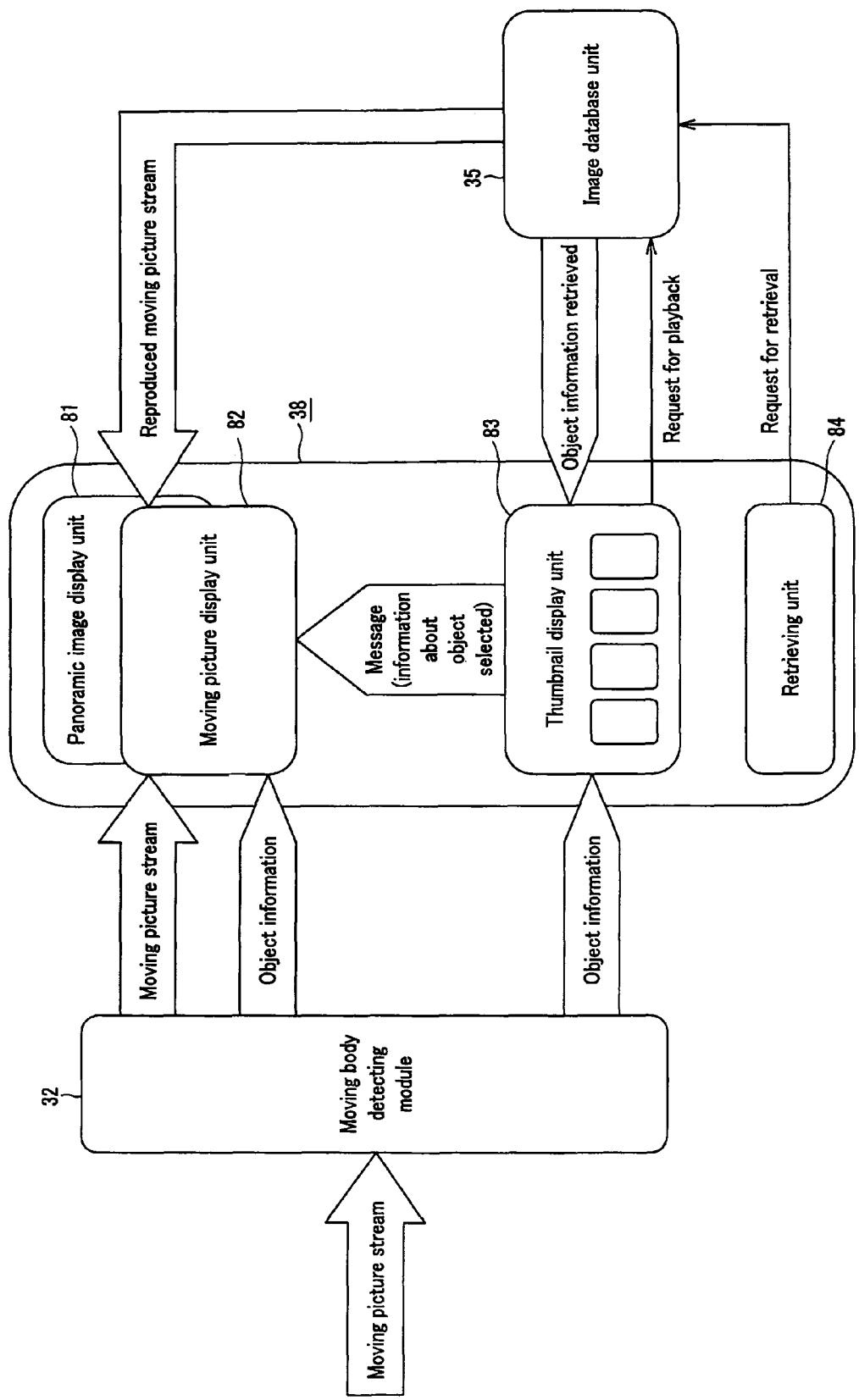
FIG. 3 is a block diagram illustrating the major components of the result displaying module incorporated in the client.
Figure 4:
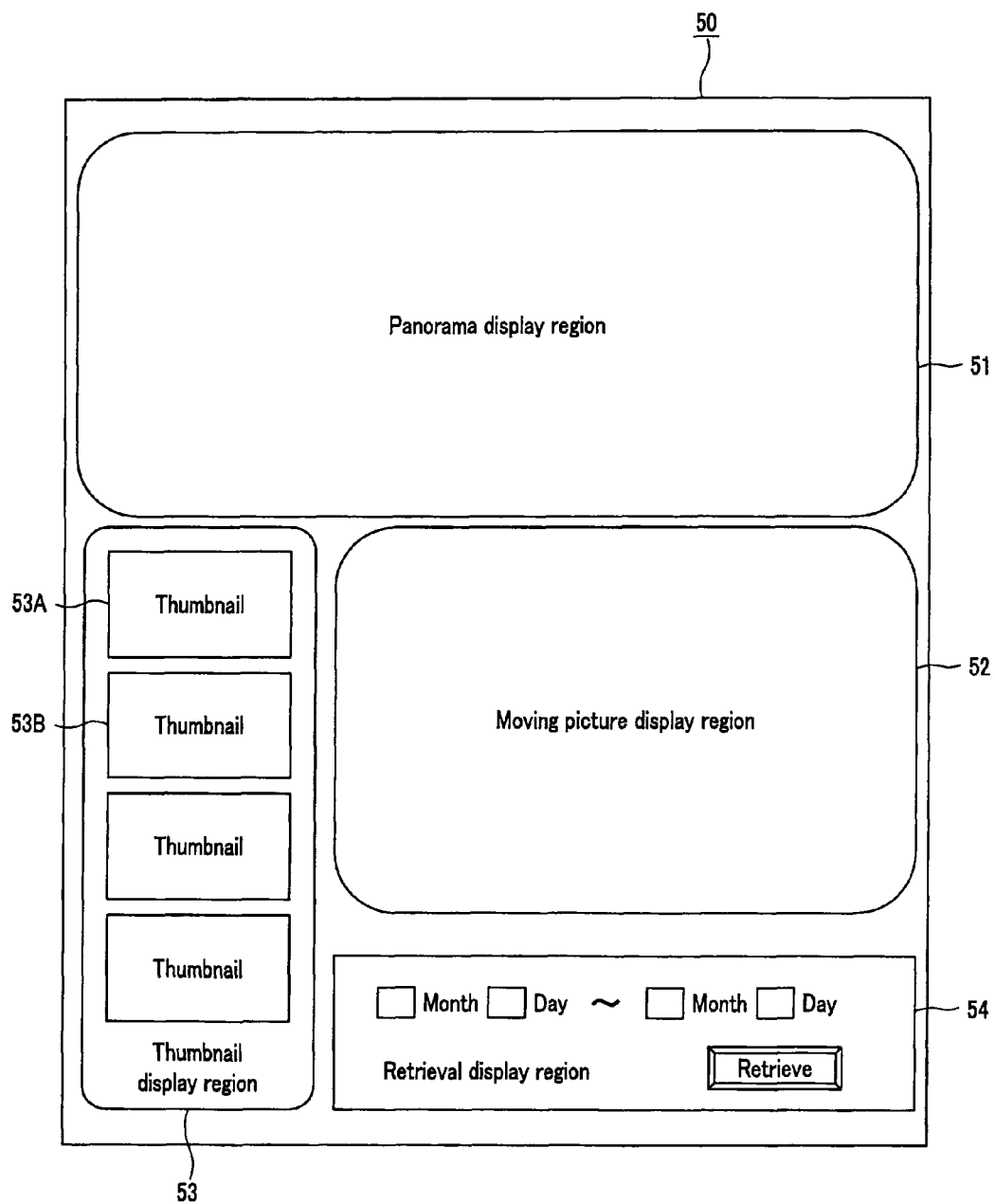
FIG. 4 is a diagram schematically representing the contents displayed in the display screen of the client.

As FIG. 3 shows, the result displaying module 38 includes a panoramic image display unit 81, a moving picture display unit 82, a thumbnail display unit 83, and a retrieving unit 84. As FIG. 4 depicts, the panoramic image display unit 81 displays a panoramic image of the monitored area, photographed by the sensor camera 10, in the panorama display region 51 of the display screen 50 of the client 30. The moving picture display unit 82 displays a moving picture photographed by the zooming camera 20 and containing the image of the object of interest, in the moving picture display region 52 of the display screen 50 of the client 30. The thumbnail display unit 83 displays the object being monitored, detected by the moving body detecting module 32, in the thumbnail display region 53 of the display screen 50 of the client 30, while updating the data about the object at prescribed intervals. The retrieving unit 84 displays retrieval conditions and a retrieval button in the retrieval display region 54 of the display screen 50 of the client 30.

If the moving picture display unit 82 is displaying the object in the moving picture display region 52, the thumbnail display unit 83 displays the object in highlighted fashion when the user operates the mouse, moving the cursor to one of thumbnails 53A, 53B, . . . displayed in the thumbnail display region 53. The object that the thumbnail display unit 83 displays in the thumbnail display region 53 is represented by the data detected in the immediately preceding updating interval. Therefore, the object may not be displayed in the thumbnail display region 53. In this case, no particular action is performed.

The retrieving unit 84 performs data retrieval when a retrieval period is designated in the retrieval display region 54 and the retrieval button displayed in the region 54 is clicked. In the retrieval period thus designated, thumbnails of the object are retrieved. The thumbnail display unit 83 displays a list of the thumbnails retrieved in this period, in the thumbnail display region 53. Using the mouse, the user selects a desired thumbnail from the list, moving the cursor to one of the thumbnails 53A, 53B, . . . displayed in the thumbnail display region 53. Then, the moving picture containing the object and starting at the time the object appeared in the picture is reproduced from the image database unit 35. The moving picture display unit 82 displays this moving picture in the moving picture display region 52.

In the centralized monitoring/recording system 100, the moving-body detecting module 32 detects the object from every frame of the moving picture stream generated in the live photographing performed by the sensor camera 10 or in the playback of a moving picture file. The module 32 checks the object for its identity, thereby determining whether the object is contained in two or more consecutive frames. The information about the object detected by the moving body detecting module 32 is supplied to the moving picture display unit 82 and thumbnail display unit 83. The moving picture stream supplied to the moving body detecting module 32 is supplied to the panoramic image display unit 81 and moving picture display unit 82.

The thumbnail display unit 83 displays the object detected by the moving body detecting module 32, in the thumbnail display region 53 of the display screen 50 of the client 30, while updating the data about the object at the prescribed intervals. Further, the thumbnail display unit 83 supplies a message to the moving picture display unit 82. The message prompts the user to designate an object should be highlighted when it is selected in the thumbnail display region 53.

The thumbnail display unit 83 selects appropriate object information from the information items about the object that are transmitted from the moving body detecting module 32 for each frame. This selection is carried out within a prescribed updating period. At the end of the updating period, the thumbnail contained in the object information selected is displayed. When the thumbnail is selected by the use of the mouse or the like, the object information about the thumbnail is transmitted, as a message, to the moving picture display unit 82.

The moving picture display unit 82 displays the moving picture stream in real time, highlighting the designated object if it receives the message from the thumbnail display unit 83. The object received along the message may not be identical, in position, size and the like, to the object in the frame being displayed. Even in this case, the corresponding information can be acquired from the latest object information, whereby the object is displayed in an appropriate highlighted fashion.

In this centralized monitoring/recording system 100, the moving body detecting module 32 detects the object from the moving picture information sent from the sensor camera 10, and the object detected in each frame is checked for identity. Thus, the object is determined to be one contained in two or more consecutive frames. Then, the thumbnail display unit 83 displays each object that appears within a prescribed period, as a thumbnail extracted from a representative frame, on the basis of the object information detected by the moving body detecting module 32. The zooming camera 20 tracks the object to be monitored, which has been detected by the moving body detecting module 32, obtaining a moving picture of the object magnified. The moving picture display unit 82 displays the moving picture thus obtained. The thumbnail display unit 83 receives the input made when the user selects the thumbnail displayed. In accordance with this input, the moving picture display unit 82 displays the moving picture that contains the object identified by the thumbnail selected.

Thus, the object detected in each frame is examined for identity, thereby determining whether the object is contained in two or more consecutive frames, in the centralized monitoring/recording system 100. In this system, each object that appears within the prescribed period is displayed as a thumbnail extracted from a representative frame, and the object is identified by using the thumbnail and subjected to an operation. This enhances the operability of the system. For example, it is relatively easy to designate a thumbnail of a car, thereby to select a tracking command in a menu, though it is difficult to designate the car in the screen by operating the mouse or the like, as the car being tracked by a pan/tilt camera is moving at high speed in the screen.

In the centralized monitoring/recording system 100, the image database unit 35 accumulates not only the moving picture information obtained by the sensor camera 10 and zooming camera 20, but also the object information detected by the moving body detecting module 32.

Further, in the centralized monitoring/recording system 100, the moving picture information is reproduced, together with the object information accumulated in the image database unit 35. On the basis of the object information reproduced, all objects existing in a period designated are displayed in the form of a list of thumbnails. Any object is thereby retrieved from the list of thumbnails.

That is, the thumbnail display unit 83 displays the list of thumbnails in the thumbnail display region 53 when the retrieving unit 84 designates a retrieval period and gives a retrieval command to the image database unit 35. When a thumbnail is designated in the thumbnail display region 53, the thumbnail display unit 83 gives a command for reproducing this object to the image database unit 35. The image database unit 35 starts reproducing the object at the very time the object appears. The unit 35 transmits the object, thus reproduced, to the moving picture display unit 82. The moving picture display unit 82 displays the object.

The thumbnail display unit 83 need not be of the type that is updated at regular intervals. It may instead be one that accumulates and displays any object that appeared in the past. In this case, the longer any object has been designated in the thumbnail display unit 83, the smaller the chance it may be displayed in the moving picture display unit 82. Nonetheless, the blocks interact almost in the same way as described above.

To reproduce the moving picture thus recorded, the objects existing in any period designated are displayed as a list of thumbnails. One of the thumbnails in the list may be designated. Then, the scenes in which the object of interest appears can be easily retrieved. Since the object can be identified, it is easy to skip some frames of the moving picture to the scene in which the object appears again after having been disappeared.

It should be understood by those skilled in the art that various modifications, combinations, sub-combinations and alternations may occur depending on design requirements and other factors insofar as they are within the scope of the appended claims or the equivalents thereof.

What is claimed is:

1. An apparatus for processing images, comprising:
a moving body detecting means for detecting a plurality of objects from inputted moving picture information, for determining an identity of each of the plurality of objects, and for determining whether each of the plurality of objects appears in two or more consecutive frames of the inputted moving picture information based on the identity of each of the plurality of objects;
a thumbnail displaying means for displaying each of the plurality of objects that have appeared in the inputted moving picture information in two or more consecutive frames within a prescribed period, as thumbnails extracted from representative frames, based on object information detected by the moving body detecting means, each of the plurality of objects that have appeared in the inputted moving picture information in two or more consecutive frames within the prescribed period being represented by only one thumbnail;

an operation input means for receiving an operation input resulting from selecting one of the thumbnails displayed by the thumbnail displaying means; and a moving picture displaying means for displaying a moving picture that contains an object identified by a selected thumbnail related to the operation input received by the operation input means.

2. The apparatus for processing images, according to claim 1, further comprising a recording means for recording, in a recording medium, the inputted moving picture information and the object information detected by the moving body detecting means.

3. The apparatus for processing images, according to claim 1, further comprising a broad area photographing means for photographing a broad area and an object tracking and photographing means for tracking at least one of the objects and providing a magnified image of at least one of the objects, and in which the moving body detecting means detects each of the plurality of objects from the inputted moving picture information obtained by the broad area photographing means and representing an image of the broad area, and in which the moving picture displaying means displays a moving picture obtained by tracking the at least one of the objects detected by the moving body detecting means and providing the magnified image of the at least one of the objects by the object tracking and photographing means.

4. A method of processing images, comprising:
detecting a plurality of objects from inputted moving picture information obtained via at least one camera and determining an identity of each of the plurality of objects;
determining whether each of the plurality of objects appears in two or more consecutive frames of the inputted moving picture information based on the identity of each of the plurality of objects;
displaying each of the plurality of objects that have appeared in the inputted moving picture information in two or more consecutive frames within a prescribed period, as thumbnails extracted from representative frames, based on object information that has been detected, each of the plurality of objects that have appeared in the inputted moving picture information in two or more consecutive frames within the prescribed period being represented by only one thumbnail;
receiving an operation input resulting from selecting one of the thumbnails displayed; and
displaying a moving picture that contains an object identified by a selected thumbnail related to the operation input that has been received.

5. The method of processing images, according to claim 4, wherein the inputted moving picture information and the object information detected are recorded in a recording medium.

6. An apparatus for processing images, comprising:
a moving body detecting unit that detects a plurality of objects from inputted moving picture information, that determines an identity of each of the plurality of objects, and that determines whether each of the plurality of objects appears in two or more consecutive frames of the inputted moving picture information;
a thumbnail displaying unit that displays each of the plurality of objects that have appeared in the inputted moving picture information in two or more consecutive frames within a prescribed period, as thumbnails extracted from representative frames, based on object information detected by the moving body detecting unit, each of the plurality of objects that have appeared in the inputted moving picture information in two or more consecutive frames within the prescribed period being represented by only one thumbnail;
an operation input unit that receives an operation input resulting from selecting one of the thumbnails displayed by the thumbnail displaying unit; and
a moving picture displaying unit that displays a moving picture that contains an object identified by a selected thumbnail related to the operation input received by the operation input unit.

7. The apparatus for processing images, according to claim 1, wherein the object identified by the selected thumbnail is tracked by panning a camera in accordance with a panoramic view.

8. The apparatus for processing images, according to claim 1, wherein the object identified by the selected thumbnail is tracked by tilting a camera.

9. The apparatus for processing images, according to claim 1, wherein the moving picture includes non-contiguous portions of the inputted moving picture information obtained by skipping frames of the inputted moving picture information in which the object identified by the selected thumbnail does not appear.

10. The apparatus for processing images, according to claim 1, wherein the object identified by the selected thumbnail is highlighted in the moving picture.

11. The apparatus for processing images, according to claim 1, wherein the object identified by the selected thumbnail is shown in the moving picture, and
wherein the object identified by the selected thumbnail is described in the object information.

12. The apparatus for processing images, according to claim 11, wherein the object identified by the selected thumbnail shown in the moving picture is not identical in one or more of position and size to the object identified by the selected thumbnail described in the object information.

13. The method for processing images, according to claim 4, further comprising tracking the object identified by the selected thumbnail by panning a camera in accordance with a panoramic view.

14. The method for processing images, according to claim 4, further comprising tracking the object identified by the selected thumbnail by tilting a camera.

15. The method for processing images, according to claim 4, wherein the moving picture includes non-contiguous portions of the inputted moving picture information obtained by skipping frames of the inputted moving picture information in which the object identified by the selected thumbnail does not appear.

16. The method for processing images, according to claim 4, further comprising highlighting the object identified by the selected thumbnail in the moving picture.

17. The apparatus for processing images, according to claim 6, wherein the moving picture includes non-contiguous portions of the inputted moving picture information obtained by skipping frames of the inputted moving picture information in which the object identified by the selected thumbnail does not appear.

18. The apparatus for processing images, according to claim 1, wherein the object identified by the selected thumbnail is moving at a high speed in the inputted moving picture information.

* * * * *